(12) United States Patent
Uenishi et al.

(10) Patent No.: US 11,232,909 B2
(45) Date of Patent: Jan. 25, 2022

(54) MULTILAYER CERAMIC CAPACITOR

(71) Applicant: TAIYO YUDEN CO., LTD., Tokyo (JP)

(72) Inventors: Hiroaki Uenishi, Takasaki (JP); Takehiko Kamobe, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/544,666

(22) Filed: Aug. 19, 2019

(65) Prior Publication Data

US 2020/0066450 A1 Feb. 27, 2020

(30) Foreign Application Priority Data

Aug. 23, 2018 (JP) .............................. JP2018-156695

(51) Int. Cl.
| | |
|---|---|
| *H01G 4/232* | (2006.01) |
| *H01G 4/30* | (2006.01) |
| *H01G 4/012* | (2006.01) |
| *H01G 4/224* | (2006.01) |
| *H01G 4/12* | (2006.01) |

(52) U.S. Cl.
CPC ........... *H01G 4/2325* (2013.01); *H01G 4/012* (2013.01); *H01G 4/224* (2013.01); *H01G 4/30* (2013.01); *H01G 4/1245* (2013.01)

(58) Field of Classification Search
CPC .......... H01G 4/228; H01G 4/232; H01G 4/30; H01G 4/224
See application file for complete search history.

(56) References Cited

U.S. PATENT DOCUMENTS

| | | | | |
|---|---|---|---|---|
| 2006/0215350 A1* | 9/2006 | Tonogai | ................... | H01G 4/30 361/311 |
| 2007/0195484 A1* | 8/2007 | Bultitude | ............... | H01G 4/012 361/311 |
| 2012/0019978 A1* | 1/2012 | Yoshida | ................ | H01F 27/292 361/301.4 |
| 2014/0131082 A1* | 5/2014 | Ahn | ...................... | H05K 3/3442 174/260 |
| 2014/0138136 A1* | 5/2014 | Ahn | ...................... | H05K 3/3442 174/260 |

(Continued)

FOREIGN PATENT DOCUMENTS

| | | | |
|---|---|---|---|
| JP | 04302118 A | * | 10/1992 |
| JP | 2016066783 A | | 4/2016 |

*Primary Examiner* — Eric W Thomas
(74) *Attorney, Agent, or Firm* — Law Office of Katsuhiro Arai

(57) ABSTRACT

A multilayer ceramic capacitor includes: a multilayer chip in which each of dielectric layers and each of internal electrode layers are alternately stacked and each of the internal electrode layers is alternately exposed to two end faces; external electrodes including a ground layer and a plated layer, the ground layer extending from the two end faces to at least one face of four faces of the multilayer chip, the plated layer being provided on the ground layer, a part of the plated layer contacting the at least one face; and a dummy layer that is provided between a capacity region and the at least one face and intersects with a region in which the plated layer contacts the multilayer chip without the ground layer, a main component of the dummy layer being a metal or an alloy including at least Ni.

10 Claims, 7 Drawing Sheets

(56) References Cited

U.S. PATENT DOCUMENTS

| | | | |
|---|---|---|---|
| 2014/0290998 A1* | 10/2014 | Ahn | H01G 4/248 |
| | | | 174/260 |
| 2014/0321025 A1* | 10/2014 | Saito | H01G 4/232 |
| | | | 361/305 |
| 2015/0096795 A1* | 4/2015 | Hong | H01G 4/30 |
| | | | 174/260 |
| 2016/0086733 A1 | 3/2016 | Saito et al. | |
| 2016/0276106 A1* | 9/2016 | Kuroiwa | H01G 4/30 |
| 2019/0157004 A1* | 5/2019 | Park | H01G 4/30 |
| 2019/0172643 A1* | 6/2019 | Cha | H01G 4/224 |
| 2019/0172646 A1* | 6/2019 | Kim | H01G 4/1245 |

* cited by examiner

MULTILAYER CERAMIC CAPACITOR

CROSS-REFERENCE TO RELATED APPLICATION

This application is based upon and claims the benefit of priority of the prior Japanese Patent Application No. 2018-156695, filed on Aug. 23, 2018, the entire contents of which are incorporated herein by reference.

FIELD

A certain aspect of the present invention relates to a multilayer ceramic capacitor and a manufacturing method of the multilayer ceramic capacitor.

BACKGROUND

A multilayer ceramic capacitor has a multilayer structure in which a plurality of dielectric layers and a plurality of internal electrode layers are alternately stacked, and a pair of external electrodes that are formed on a surface of the multilayer structure and are electrically coupled to the internal electrode layers extracted to the surface. The external electrode has a structure in which a ground layer is subjected to a plating. It is known that hydrogen generated in the plating diffuses into a main body and causes IR (insulation resistance) degradation after being stored near the external electrodes.

Japanese Patent Application Publication No. 2016-66783 discloses a technology in which hydrogen stored in the multilayer structure by the plating is released when the multilayer structure after the plating is subjected to a thermal treatment.

SUMMARY OF THE INVENTION

However, it is difficult to sufficiently suppress the IR degradation.

The present invention has a purpose of providing a multilayer ceramic capacitor and a manufacturing method of the multilayer ceramic capacitor that are capable of suppressing IR degradation.

According to an aspect of the present invention, there is provided a multilayer ceramic capacitor including: a multilayer chip having a parallelepiped shape in which each of a plurality of dielectric layers and each of a plurality of internal electrode layers are alternately stacked and each of the plurality of internal electrode layers is alternately exposed to two end faces of the multilayer chip, a main component of the plurality of dielectric layers being a ceramic; a pair of external electrodes including a ground layer and a plated layer, the ground layer extending from the two end faces to at least one face of four faces of the multilayer chip other than the two end faces, the plated layer being provided on the ground layer, a part of the plated layer contacting the at least one face; and a dummy layer that is provided between a capacity region and the at least one face and intersects with a region in which the plated layer contacts the multilayer chip without the ground layer, a main component of the dummy layer being a metal or an alloy including at least Ni, the capacity region being a region in which a set of the internal electrode layers connected to one of the end faces face another set of the internal electrode layers connected to the other.

According to another aspect of the present invention, there is provided a manufacturing method of a ceramic multilayer capacitor including: forming a plurality of stack units by providing a pattern of conductive paste for an internal electrode layer, on each of green sheets including main component ceramic grains; forming a ceramic multilayer structure by stacking the plurality of stack units so that positions of the patterns are alternately shifted; forming a cover sheet multilayer structure by providing a pattern of paste for a dummy layer including Ni and a second cover sheet in order, on a first cover sheet including main component ceramic grains, the second cover sheet including main component ceramic grains; and forming a multilayer chip by providing the cover sheet multilayer structure on each of an upper face and a lower face in a stacking direction of the ceramic multilayer structure and firing the ceramic multilayer structure and the cover sheets together with each other, wherein the pattern for a dummy layer is provided so that the pattern for a dummy layer intersects with a region in which a plated layer contacts the multilayer chip without a ground layer, the plated layer and the ground layer being included in a pair of external electrodes, the ground layer being formed from two end faces of the multilayer chip to an upper face and a lower face of the multilayer chip, the plated layer being formed on the ground layer, a part of the plated layer contacting the upper face and the lower face of the multilayer chip.

According to another aspect of the present invention, there is provided a manufacturing method of a ceramic multilayer capacitor including: forming a plurality of stack units by providing a pattern of conductive paste for an internal electrode layer and a pattern for a dummy layer including Ni, on each of green sheets including main component ceramic grains; forming a ceramic multilayer structure by stacking the plurality of stack units so that positions of the patterns are alternately shifted; forming a multilayer chip by providing a cover sheet on each of an upper face and a lower face in a stacking direction of the ceramic multilayer structure and firing the ceramic multilayer structure and the cover sheets together with each other, wherein the pattern for a dummy layer is provided so that the pattern for a dummy layer intersects with a region in which a plated layer contacts the multilayer chip without a ground layer, the plated layer and the ground layer being included in a pair of external electrodes, the ground layer being formed from two end faces of the multilayer chip to two side faces of the multilayer chip other than the two end faces, the plated layer being formed on the ground layer, a part of the plated layer contacting the two side faces of the multilayer chip.

According to another aspect of the present invention, there is provided a manufacturing method of a multilayer ceramic capacitor including: forming a plurality of stack units by providing a pattern of conductive paste for an internal electrode layer, on each of green sheets including main component ceramic grains; forming a first ceramic multilayer structure by stacking the plurality of stack units so that positions of the patterns are alternately shifted; forming a cover sheet multilayer structure by providing a pattern of paste for a dummy layer including Ni and a second cover sheet in order, on a first cover sheet including main component ceramic grains, the second cover sheet including main component ceramic grains; and forming a second ceramic multilayer structure by providing the cover sheet multilayer structure on each of an upper face and a lower face in a stacking direction of the first ceramic multilayer structure; forming a third ceramic multilayer structure by forming two end faces to which each of the patterns are alternately exposed and two side faces to which all of the patterns are exposed, by cutting the second ceramic multilayer structure, forming a side margin multilayer structure by providing a pattern for a dummy layer including Ni and a second side margin sheet including main component ceramic grains in order, on a first side margin sheet including main component ceramic grains; forming a multilayer chip by providing the side margin multilayer structure on the two side faces of the third ceramic multilayer structure, providing a cover sheet on an upper face and a lower face in a stacking direction of the third ceramic multilayer structure, and firing the third ceramic multilayer, the cover sheets and the side margin multilayer structures; wherein the pattern for a dummy layer is provided so that the pattern for a dummy layer intersects with a region in which a plated layer contacts the multilayer chip without a ground layer, the plated layer and the ground layer being included in a pair of external electrodes, the ground layer being formed from two end faces of the multilayer chip to two side faces of the multilayer chip other than the two end faces, the plated layer being formed on the ground layer, a part of the plated layer contacting the two side faces of the multilayer chip.

DETAILED DESCRIPTION

A description will be given of an embodiment with reference to the accompanying drawings.

EMBODIMENT

Figure 1:
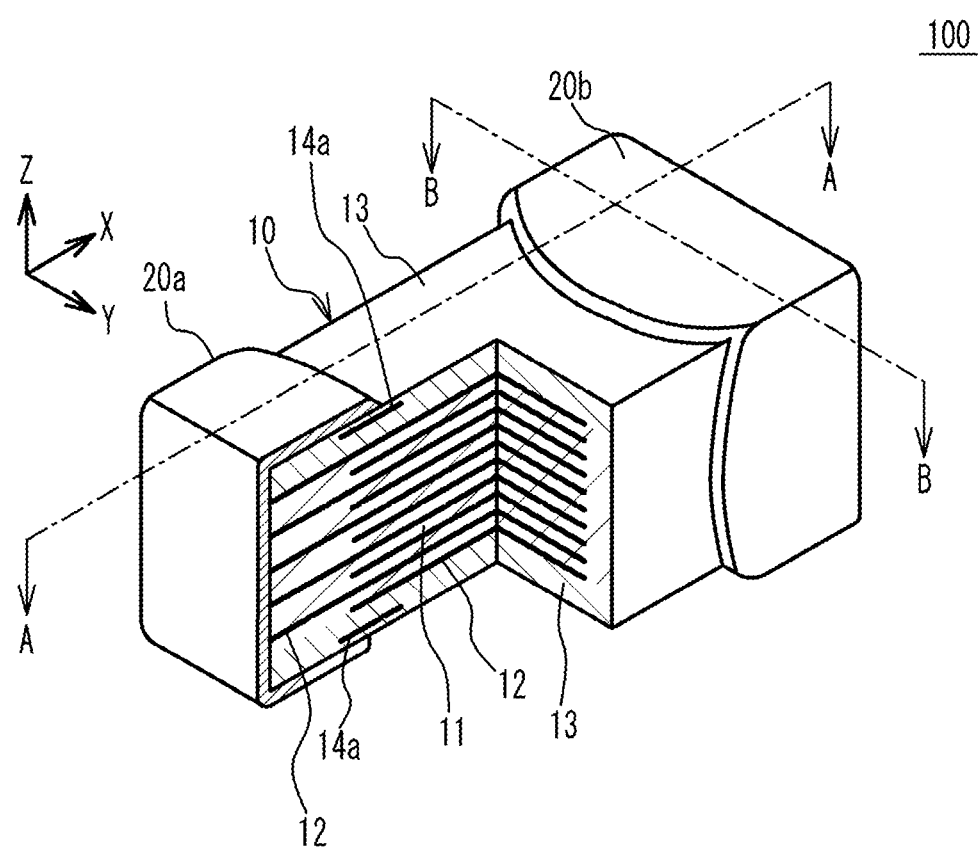
FIG. 1 illustrates a partial perspective view of a multilayer ceramic capacitor in accordance with an embodiment.
Figure 2A:
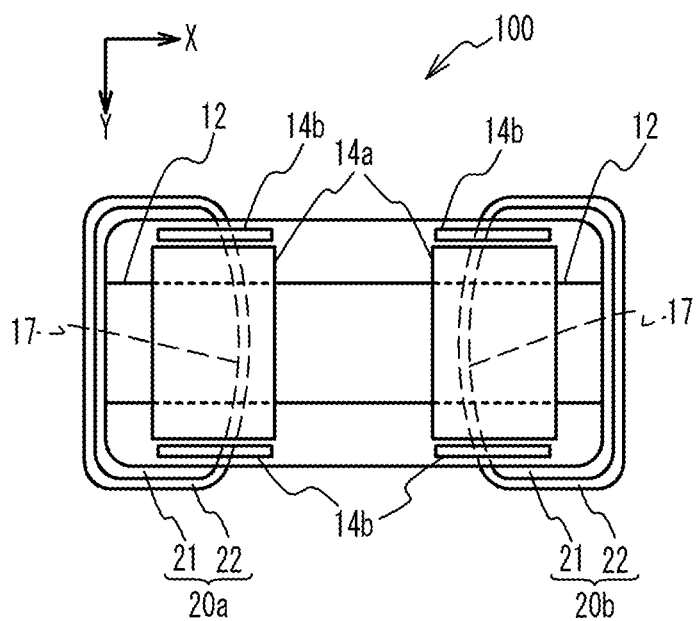
FIG. 2A illustrates a plan view of a multilayer ceramic capacitor that is partially transmitted.
Figure 2B:
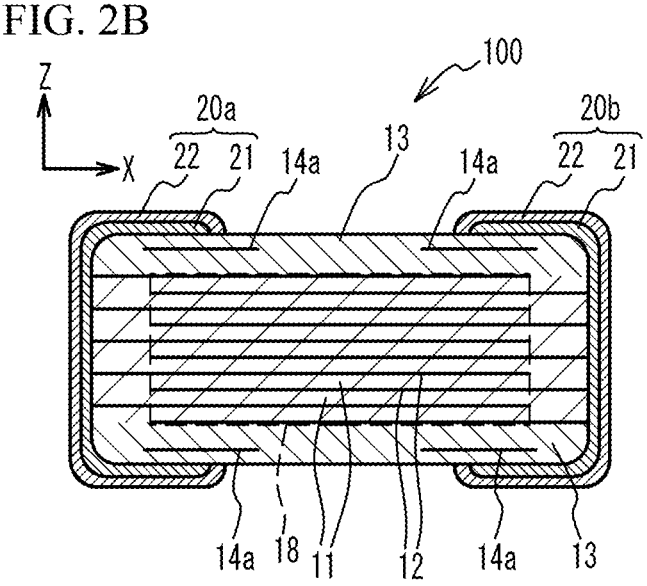
FIG. 2B illustrates a cross sectional view taken along a line A-A of FIG. 1.
Figure 2C:
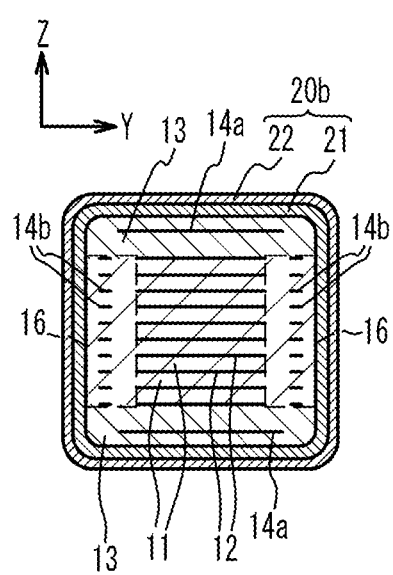
FIG. 2C illustrates a cross sectional view taken along a line B-B of FIG. 1.

FIG. 1 illustrates a partial perspective view of a multilayer ceramic capacitor 100 in accordance with an embodiment. FIG. 2A illustrates a plan view of the multilayer ceramic capacitor 100 that is partially transmitted. FIG. 2B illustrates a cross sectional view taken along a line A-A of FIG. 1. FIG. 2C illustrates a cross sectional view taken along a line B-B of FIG. 1. As illustrated in FIG. 1, a longitudinal direction of the multilayer ceramic capacitor 100 is an X-direction. A short direction of the multilayer ceramic capacitor 100 is a Y-direction. A height direction of the multilayer ceramic capacitor 100 is a Z-direction.

As illustrated in FIG. 1 to FIG. 2C, the multilayer ceramic capacitor 100 includes a multilayer chip 10 having a rectangular parallelepiped shape, and a pair of external electrodes 20a and 20b that are respectively provided at two end faces of the multilayer chip 10 facing each other (two end faces facing in the X-direction in FIG. 1). Two faces other than an upper face and a lower face in a stacking direction among four faces other than the two end faces are referred to as side faces. The external electrodes 20a and 20b extend to the upper face, the lower face and the two side faces. However, the external electrodes 20a and 20b are spaced from each other.

The multilayer chip 10 has a structure designed to have dielectric layers 11 and internal electrode layers 12 alternately stacked. The dielectric layer 11 include a ceramic material acting as a dielectric material. The internal electrode layers 12 include a metal material such as a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12.

In the multilayer structure of the dielectric layers 11 and the internal electrode layers 12, two of the internal electrode layers 12 act as outermost layers in the stacking direction (Z-direction). Cover layers 13 cover the upper face and the lower face of the multilayer structure. A main component of the cover layer 13 is a ceramic material. For example, a main component material of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. An average thickness of the internal electrode layer 12 is, for example, 1.0 μm or less. A main component of the dielectric layers 11 is a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. An average thickness of the dielectric layers 11 is, for example, 1.0 μm or less.

As illustrated in FIG. 2B, a region, in which a set of the internal electrode layers 12 connected to the external electrode 20a face another set of the internal electrode layers 12 connected to the external electrode 20b, is a region generating electrical capacity in the multilayer ceramic capacitor 100. And so, the region is referred to as a capacity region 18.

That is, the capacity region 18 is a region in which the internal electrode layers 12 next to each other are connected to different external electrodes face each other.

As illustrated in FIG. 2C, a region of the multilayer chip 10 from the two side faces thereof to the internal electrode layers 12 is referred to as side margins 16. That is, the side margin 16 is a region covering edges of the stacked internal electrode layers 12 in the extension direction toward the two side faces. The side margin 16 does not generate electrical capacity. The cover layer 13 and the side margin 16 may be referred to as a circumference region around the capacity region 18.

As illustrated in FIG. 2B, the external electrodes 20a and 20b have a structure in which a plated layer 22 is formed on a ground layer 21 formed on the surface of the multilayer chip 10.

The ground layer 21 is not limited. A main component of the ground layer 21 is a metal which is Ni or Cu, or an alloy of Ni and Cu. The ground layer 21 may include a glass component for densifying the ground layer 21 or a co-material for controlling sinterability of the ground layer 21. The glass is an oxide of Ba, Sr, Ca, Zn (zinc), Al (aluminum), Si (silicon), B (boron) or the like. The co-material is a ceramic component of which a main component is the same as that of the dielectric layers 11.

A main component of the plated layer 22 is a metal such as Cu, Ni, Al, Zn, or Sn or an alloy including two or more of them. The plated layer 22 may be a plated layer of a single metal component or may include a plurality of plated layers having a different metal. The ground layer 21 and the plated layer 22 cover both of the end faces of the multilayer chip 10 and extend to at least one of the four side faces of the multilayer chip 10. In the embodiment, the ground layer 21 and the plated layer 22 extend to the four side faces from both of the end faces of the multilayer chip 10. The plated layer 22 extends to a position near a center of the surface of the multilayer chip 10, in the direction (X-direction) in which the two end faces of the multilayer chip 10 face with each other. And a distance between an edge of the plater layer 22 and the center is smaller than a distance between an edge of the ground layer 21 and the center. Therefore, a part of the plater layer 22 directly contacts the multilayer chip 10 without the ground layer 21.

Figure 3A:
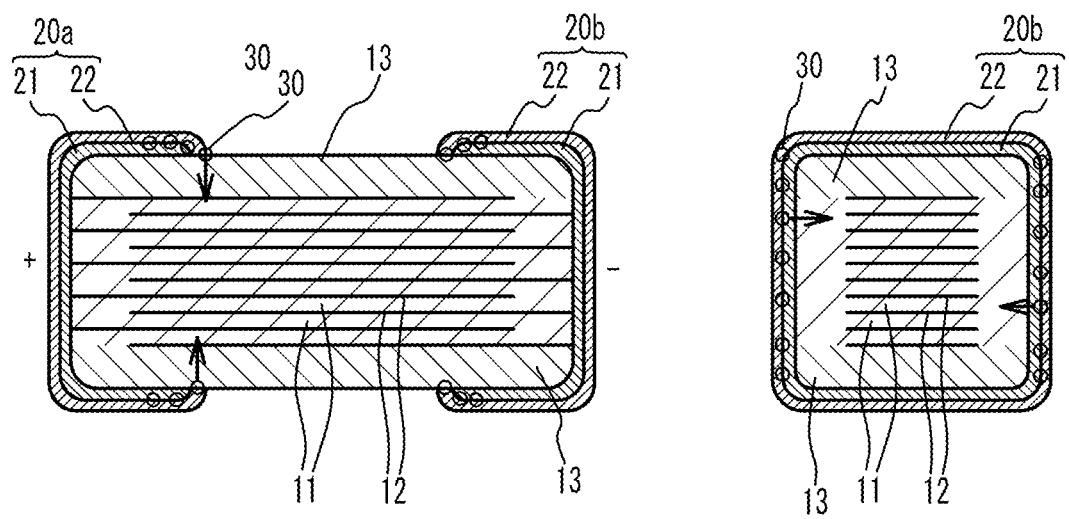
FIG. 3A and FIG. 3B illustrates movement of hydrogen.
Figure 3B:
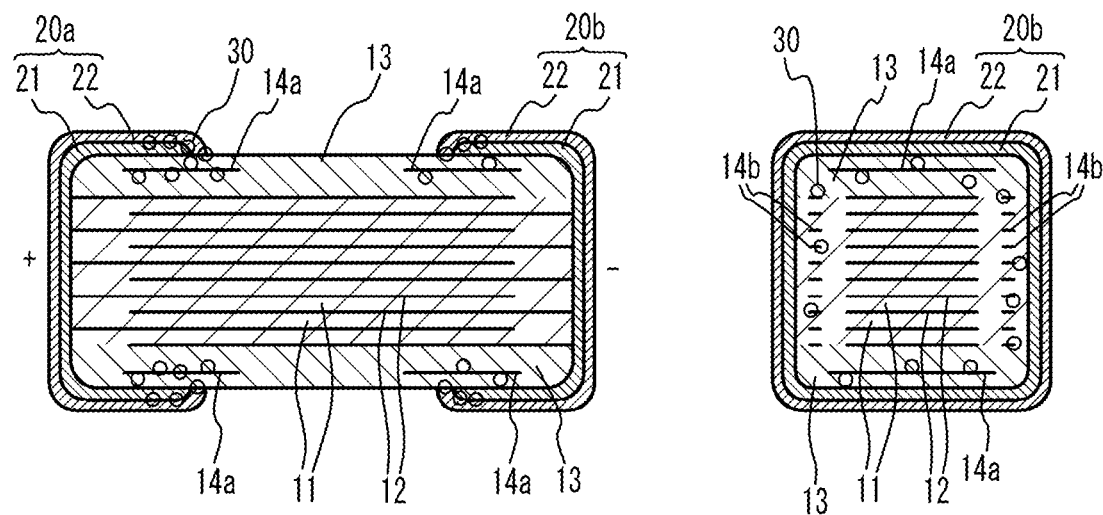

Hydrogen 30 is generated during forming of the plated layer 22 and is stored near the external electrodes 20a and 20b (for example, an interface between the multilayer chip 10 and the plated layer 22 and an interface between the ground layer 21 and the plated layer 22). When a voltage is applied to the multilayer ceramic capacitor 100, the hydrogen 30 moves toward the internal electrode layer 12 as indicated by an arrow in FIG. 3A. When the hydrogen 30 reaches the internal electrode layer 12, the hydrogen 30 reduces a part of the dielectric layer 11 around the hydrogen 30. In this case, IR degradation may occur.

And so, the multilayer chip 10 of the multilayer ceramic capacitor 100 of the embodiment has dummy layers 14a and 14b to trap the hydrogen stored around the external electrodes 20a and 20b, in a circumference region around the capacity region 18, as illustrated in FIG. 1 to FIG. 2C. A main component of the dummy layers 14a and 14b is a metal material including at least Ni or an alloy including at least Ni.

The dummy layer 14a is formed between the upper face and/or the lower face and the capacity region 18, as illustrated in FIG. 2B and FIG. 2C. That is, the dummy layer 14a is formed in the cover layer 13. It is difficult for the hydrogen stored near the external electrodes 20a and 20b to pass through the ground layer 21. Therefore, the hydrogen 30 intrudes into the multilayer chip 10 via a region where the ground layer 21 is not provided. The region is a region 17 (illustrated in FIG. 2A) in which the plated layer 22 contacts the multilayer chip 10 without the ground layer 21. Therefore, the dummy layer 14a extends so as to intersect with the region 17 in which the plated layer 22 of the external electrodes 20a and 20b contacts the multilayer chip 10 without the ground layer 21, in a direction (X direction) in which the two end faces of the multilayer chip 10 face with each other. The dummy layers 14a in the same cover layer 13 are spaced from each other in the direction (X direction) in which the two end faces of the multilayer chip 10 face with each other.

The dummy layers 14b are formed in the side margin 16, as illustrated in FIG. 2A and FIG. 2C. A width of the dummy layers 14b in the Y-direction is, for example, 20 μm. As well as the dummy layer 14a, the dummy layer 14b also extends and intersects with the region 17 in which the plater layer 22 of the external electrodes 20a and 20b contacts the multilayer chip 10 without the ground layer 21, in the direction (X-direction) in which the two end faces of the multilayer chip 10 face with each other. Moreover, the dummy layer 14b formed on the side of the external electrode 20a is spaced from the dummy layer 14b formed on the side of the external electrode 20b.

In this manner, the hydrogen 30 is trapped by the dummy layers 14a and 14b because Ni tends to store hydrogen when the multilayer chip 10 has the dummy layers 14a and 14b, even if the hydrogen 30 stored near the external electrodes 20a and 20b moves because of the voltage applied to the multilayer ceramic capacitor 100. The trapped hydrogen 30 does not move toward the internal electrode layer 12, because electric field strength of the hydrogen 30 is small. Therefore, the movement of the hydrogen 30 toward the internal electrode layer 12 is suppressed. It is therefore possible to suppress the arrival of the hydrogen 30 at the internal electrode layer 12 and degradation of the IR.

Figure 4:
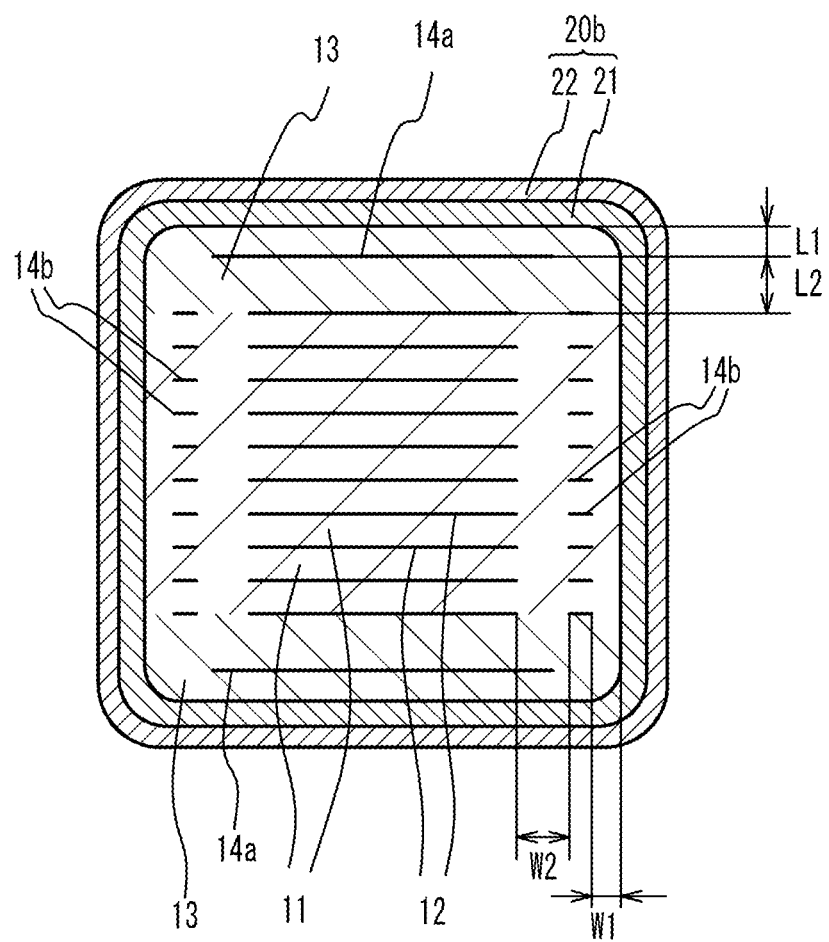
FIG. 4 illustrates positions of dummy layers.

As illustrated in FIG. 4, it is preferable that L1 is equal to or more than 10 μm, when a distance between the upper face (or the lower face) of the multilayer chip 10 and the dummy layer 14a is L1 in the stacking direction (Z direction). This is because hydrogen may intrude into the dummy layer 14a from plating solution, when the dummy layer 14a is excessively close to the external electrode 20a and 20b (a surface of the main body). It is preferable that L2 is equal to or more than 15 μm, when a distance between the dummy layer 14a and an outermost one of the internal electrode layers 12 in the stacking direction (a distance from the dummy layer 14a to the capacity region 18) is L2. This is because a region around the dummy layer 14a is reduced by the trapped hydrogen and the insulation resistance of the capacity region 18 may be easily degraded, when the dummy layer 14a including the trapped hydrogen is excessively close to the internal electrode layer 12.

As illustrated in FIG. 4, it is preferable that W1 is equal to or more than 10 μm when a distance between the side face of the multilayer chip 10 and an external edge of the dummy layer 14b (on the side of the external electrodes 20a and 20b) is W1 in a facing direction of the side faces of the multilayer chip 10 (Y-direction). This is because hydrogen intrudes into the dummy layer 14b from the plating solution, when the dummy layer 14b is excessively close to the external electrodes 20a and 20b (the surface of the main body). It is preferable that W2 is equal to or more than 15 μm, when a distance between the edge of the internal electrode layer 12 and the edge of the dummy layer 14b on the side of the internal electrode layer 12 is W2. This is because a region around the dummy layer 14b is reduced by the trapped hydrogen and the insulation resistance of the capacity region 18 may be easily degraded, when the dummy layer 14b including the trapped hydrogen is excessively close to the internal electrode layer 12.

The multilayer ceramic capacitor 100 of the embodiment includes: the multilayer chip 10 having a parallelepiped shape in which each of the dielectric layers 11 and the internal electrode layers 12 are alternately stacked and each of the internal electrode layers 12 is alternately exposed to two end faces of the multilayer chip 10, a main component of the dielectric layers being a ceramic; a pair of the external electrodes 20a and 20b including the ground layer 21 and the plated layer 22, the ground layer 21 extending from the two end faces to at least one face of four faces of the multilayer chip 10 other than the two end faces, the plated layer 22 being provided on the ground layer 21, a part of the plated layer 22 contacting the at least one face; and the dummy layers 14a and 14b being provided between the capacity region 18 and the at least one face and intersects with the region 17 in which the plated layer 22 contacts the multilayer chip 10 without the ground layer 21, a main component of the dummy layers 14a and 14b being a metal or an alloy including at least Ni, the capacity region 18 being a region in which a set of the internal electrode layers 12 connected to one of the end faces face another set of the internal electrode layers 12 connected to the other. Even if the hydrogen 30 stored near the external electrodes 20a and 20b moves because of the voltage applied to the multilayer ceramic capacitor 100, the dummy layers 14a and 14b trap the hydrogen 30 and the movement of the hydrogen 30 toward the internal electrode layer 12 is suppressed. It is therefore possible to suppress the arrival of the hydrogen 30 at the internal electrode layer 12 and the IR degradation.

It is preferable that the width of the dummy layer 14a is larger than the width of the internal electrode layer 12 in the direction (Y-direction) in which the side faces of the multilayer chip 10 face with each other. This is because the hydrogen intruding from the corner of the multilayer chip 10 is trapped.

Figure 5:
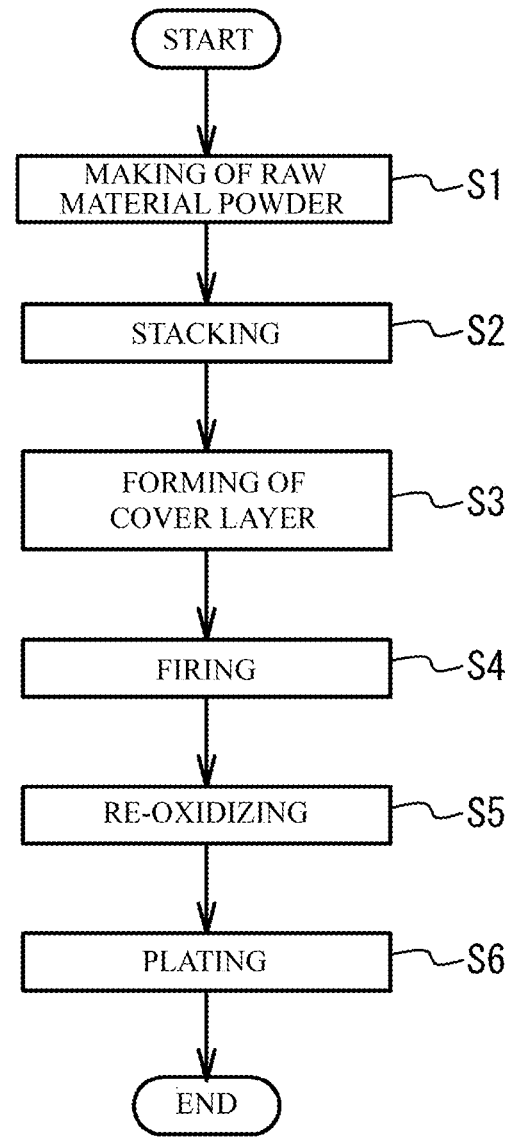
FIG. 5 illustrates a manufacturing method of a multilayer ceramic capacitor.

Next, a description will be given of a manufacturing method of the multilayer ceramic capacitor 100. FIG. 5 illustrates a manufacturing method of the multilayer ceramic capacitor 100.

(Making process of a raw material powder) Additive compound may be added to a ceramic powder material that is the main component of the dielectric layers 11, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B, Na (sodium), K (potassium) and Si, or glass. For example, compound including additive compound is mixed with the ceramic material powders. The resulting ceramic powders are calcined. Then, the ceramic powders are wet-blended with the additive compound. After that, the ceramic powders with the additive compound are dried and crushed. And, desirable ceramic powder is prepared.

(Stacking Process) Next, a binder such as polyvinyl butyral (PVB) resin, an organic solvent such as ethanol or toluene, and a plasticizer are added to the resulting dielectric material and are wet-blended. With use of the resulting slurry, a strip-shaped dielectric green sheet with a thickness of 1.0 μm or less is coated on a base material by, for example, a die coater method or a doctor blade method, and then dried.

Then, a pattern of the internal electrode layer 12 is provided on the surface of the dielectric green sheet by printing conductive paste for forming an internal electrode with use of screen printing or gravure printing. The conductive paste includes powders of a main component metal of the internal electrode layers 12, a binder, an solvent and additives if necessary. It is preferable that the binder and the solvent are different from those of the ceramic slurry. The ceramic material that is the main component of the dielectric layers 11 and acts as the co-material may be dispersed into the conductive paste.

Then, a pattern of the dummy layer 14b is provided on the surface of the dielectric green sheet by printing paste for forming a dummy layer with use of screen printing or gravure printing. The paste includes powders of Ni, a binder, an solvent and additives if necessary. It is preferable that the binder and the solvent are different from those of the ceramic slurry. The ceramic material that is the main component of the dielectric layers 11 and acts as the co-material may be dispersed into the paste.

The pattern of the dummy layer 14b may be formed after the pattern of the internal electrode layer 12 is formed. The pattern of the internal electrode layer 12 may be formed after the pattern of the dummy layer 14b is formed. Alternatively, the pattern of the internal electrode layer 12 and the pattern of the dummy layer 14b may be formed together with each other.

Then, the dielectric green sheet on which the pattern of the internal electrode layer and the pattern of the dummy layer 14b are printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations.

(Forming process of cover layers) A pattern of the dummy layer 14a is provided on a cover sheet by printing paste for forming the dummy layer with use of screen printing or gravure printing. Another cover sheet is stacked on the cover sheet. Thus, the cover layer 13 is formed. The paste for forming the dummy layer is the same as that of the dummy layer 14b. The cover layers 13 are compressed on the stacked dielectric green sheets and under the stacked dielectric green sheets. The resulting ceramic multilayer structure is stamped into a predetermined chip size (for example, 1.0 mm×0.5 mm). The binder is removed from the ceramic multilayer structure in $N_2$ atmosphere of 250 degrees C. to 500 degrees C. Metal conductive paste to be the external electrodes 20a and 20b are coated on both end faces of the cut multilayer structure by a dipping method and are dried. Thus, a compact of the multilayer ceramic capacitor 100 is formed.

(Firing Process) The resulting compact is fired for 10 minutes to 2 hours in a reductive atmosphere, of which an oxygen partial pressure is $10^{-5}$ to $10^{-8}$ atm, in a temperature range of 1100 degrees C. to 1300 degrees C. Thus, each compound is sintered. And a grains of each compound grows (densified). In this manner, the multilayer ceramic capacitor 100 is obtained. The ground layer may be fired after the firing process.

(Re-oxidizing process) After that, the multilayer ceramic capacitor 100 may be subjected to a re-oxidizing process in $N_2$ gas atmosphere in a temperature range of 600 degrees C. to 1000 degrees C.

(Plating process) After that, the plater layer 22 is formed on the ground layer 21 by plating. With the processes, the multilayer ceramic capacitor 100 is manufactured.

In the manufacturing method of the embodiment, the dummy layer 14a of which a main component is a metal or an alloy including at least Ni is provided so as to intersect with a region in which the plated layer 22 contacts the multilayer chip 10 without the ground layer 21, between the upper face of the multilayer chip 10 and an outermost one of the internal electrode layer 12 and between the lower face of the multilayer chip 10 and another outermost one of the internal electrode layers 12. Moreover, the dummy layer 14b of which a main component is a metal or an alloy including at least Ni is provided so as to intersect with a region in which the plated layer 22 contacts the multilayer chip 10 without the ground layer 21, between the side faces of the multilayer chip 10 and the internal electrode layers 12 in the direction in which the two side faces of the multilayer chip 10 face with each other. Even if the hydrogen 30 stored near the external electrodes 20a and 20b moves because of the voltage applied to the multilayer ceramic capacitor 100, the dummy layers 14a and 14b trap the hydrogen 30 and the movement of the hydrogen 30 toward the internal electrode layer 12 is suppressed. It is therefore possible to suppress the arrival of the hydrogen 30 at the internal electrode layer 12 and the IR degradation.

MODIFIED EMBODIMENT

Figure 6A:
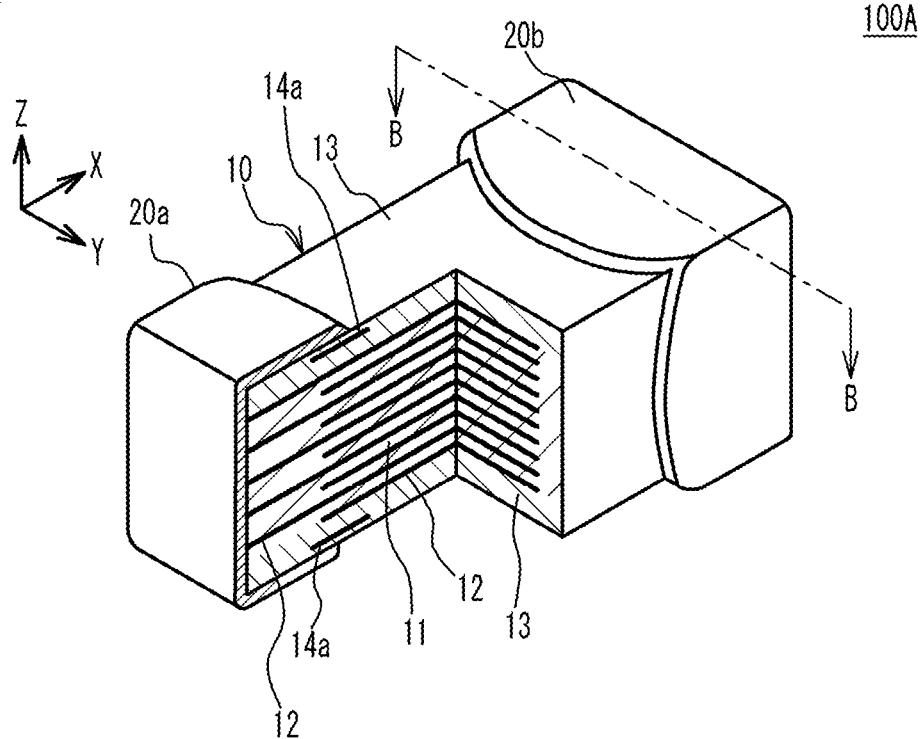
FIG. 6A illustrates a partial perspective view of a multilayer ceramic capacitor of a modified embodiment.
Figure 6B:
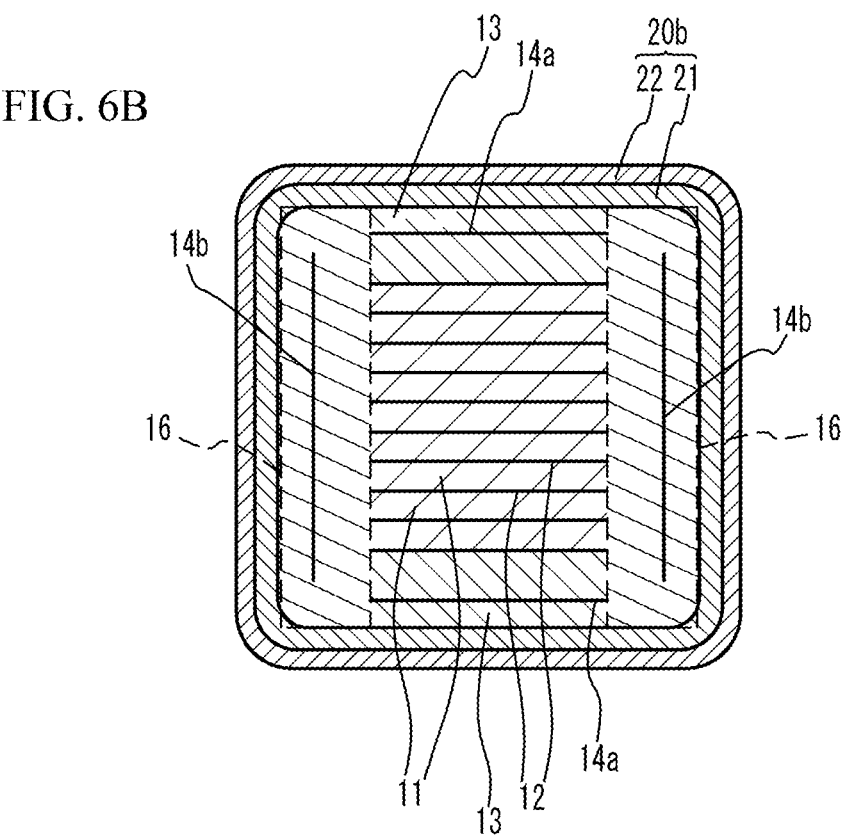
FIG. 6B illustrates a cross sectional view taken along a line B-B of FIG. 6A.

FIG. 6A illustrates a partial perspective view of a multilayer ceramic capacitor 100A. FIG. 6B illustrates a cross sectional view taken along a line B-B of FIG. 6A. As illustrated in FIG. 6B, the multilayer ceramic capacitor 100A is different from the multilayer ceramic capacitor 100 (illustrated in FIG. 3C) in a point that the dummy layers 14b in the side margin 16 is continuously provided in the stacking direction (Z-direction). Other structures are the same as those of the multilayer ceramic capacitor 100. Therefore, detail explanations of the other structures are omitted.

With the structure illustrated in FIG. 6B, it is possible to suppress the arrival of the hydrogen stored near the external electrodes 20a and 20b at the internal electrode layer 12 and the IR degradation even if a voltage is applied to the multilayer ceramic capacitor 100A. The area of the dummy layer 14b facing with the side face of the multilayer chip 10 in the multilayer ceramic capacitor 100A is larger than that of the multilayer ceramic capacitor 100. It is therefore possible to trap the hydrogen more precisely.

Figure 7:
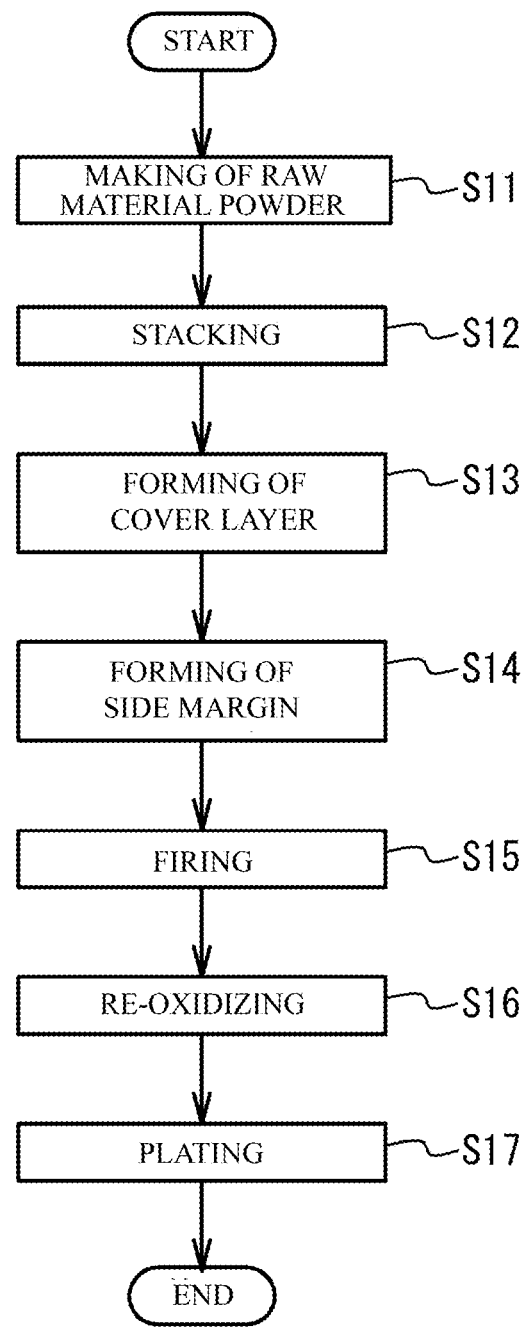
FIG. 7 illustrates a manufacturing method of a multilayer ceramic capacitor of a modified embodiment.

A description will be given of the multilayer ceramic capacitor 100A. FIG. 7 illustrates a flowchart of the manufacturing method of the multilayer ceramic capacitor 100A. Only points different from those of the multilayer ceramic capacitor 100 will be described. Details of others are omitted.

(Making process of a raw material powder) A side margin material for forming the side margin 16 is prepared in a making process of a raw material powder. Additive compound may be added to a ceramic powder of barium titanate obtained by the same process of the raw material making process of the dielectric material, in accordance with purposes. The additive compound may be an oxide of Mn, V, Cr or a rare earth element, or an oxide of Co, Ni, Li, B, Na, K and Si, or glass. The same material as the cover layer 13 may be used as the side margin material.

(Stacking process) Then, a pattern of the internal electrode layer 12 is provided on the surface of the dielectric green sheet by printing conductive paste for forming an internal electrode with use of screen printing or gravure printing. Then, the dielectric green sheet on which the pattern of the internal electrode layer 12 is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations.

(Forming process of cover layers) A pattern of the dummy layer 14a is provided on a cover sheet by printing paste for forming the dummy layer with use of screen printing or gravure printing. Another cover sheet is stacked on the cover sheet. Thus, the cover layer 13 is formed. The cover layers 13 are compressed on the stacked dielectric green sheets and under the stacked dielectric green sheets. The resulting ceramic multilayer structure is stamped into a predetermined chip size. Thus, a multilayer structure, in which the patterns of the internal electrode layers 12 are alternately exposed to two end faces and all patterns of the internal electrode layers 12 are exposed to the two side faces, is formed.

(Forming process of side margins) A binder such as polyvinyl butyral (PVB) resin, an organic solvent such as ethanol or toluene, and a plasticizer are added to the resulting side margin material and are wet-blended. With use of the resulting slurry, a strip-shaped side margin sheet with a thickness of 30 µm or less is coated on a base material by, for example, a die coater method or a doctor blade method, and then dried. Then, a pattern of the dummy layer 14b is provided on the surface of the side margin sheet by printing conductive paste for forming a dummy layer with use of screen printing or gravure printing. And another side margin sheet is stacked on the side margin sheet on which the paste is printed. Thus, a side margin multilayer structure is formed. The side margin multilayer structure to be the side margin 16 is affixed to the two side faces of the multilayer structure to which all of the internal electrode layers 12 are exposed.

In the manufacturing method of the modified embodiment, the dummy layer 14a of which a main component is a metal or an alloy including at least Ni is provided so as to intersect with a region in which the plated layer 22 contacts the multilayer chip 10 without the ground layer 21, between the upper face of the multilayer chip 10 and an outermost one of the internal electrode layer 12 and between the lower face of the multilayer chip 10 and another outermost one of the internal electrode layers 12. Moreover, the dummy layer 14b of which a main component is a metal or an alloy including at least Ni is continuously provided in the stacking direction so as to intersect with a region in which the plated layer 22 contacts the multilayer chip 10 without the ground layer 21, between the side faces of the multilayer chip 10 and the internal electrode layers 12 in the direction in which the two side faces of the multilayer chip 10 face with each other. Even if the hydrogen 30 stored near the external electrodes 20a and 20b moves because of the voltage applied to the multilayer ceramic capacitor 100, the dummy layers 14a and 14b trap the hydrogen 30 and the movement of the hydrogen 30 toward the internal electrode layer 12 is suppressed. It is therefore possible to suppress the arrival of the hydrogen 30 at the internal electrode layer 12 and the IR degradation.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a multilayer chip having a parallelepiped shape in which each of a plurality of dielectric layers and each of a plurality of internal electrode layers are alternately stacked and each of the plurality of internal electrode layers is alternately exposed to two end faces of the multilayer chip, a main component of the plurality of dielectric layers being a ceramic;
first and second external electrodes each including a ground layer and a plated layer, the ground layer extending from each corresponding face of the two end faces to at least one face of four faces of the multilayer chip other than the two end faces, the plated layer being provided on the ground layer, a part of the plated layer contacting the at least one face;
a first dummy layer that is provided between a capacity region and the at least one face and intersects with, as viewed toward each corresponding face of the at least one face, a first region in which the part of the plated layer of the first external electrode contacts the at least one face of the multilayer chip without the ground layer, a main component of the first dummy layer being a metal or an alloy including at least Ni, the capacity region being a region in which a set of the internal electrode layers connected to one of the two end faces face another set of the internal electrode layers connected to the other of the two end faces;
a second dummy layer that is provided between the capacity region and the at least one face and intersects with, as viewed toward each corresponding face of the at least one face, a second region in which the part of the plated layer of the second external electrode contacts the at least one face of the multilayer chip without the ground layer, a main component of the second dummy layer being a metal or an alloy including at least Ni; and
cover layers that are provided between an upper face of the multilayer chip and the capacity region and between a lower face of the multilayer chip and the capacity region, a main component of the cover layers being the same as that of the plurality of dielectric layers,
wherein:
the first dummy layer and the second dummy layer, which are provided between the capacity region and a same corresponding face of the at least one face, are separated and spaced from each other at a distance greater than a length of each of the first dummy layer and the second dummy layer in a length direction in which the two end faces are opposite to each other,
the first dummy layer and the second dummy layer are not electrically connected to either one of the first and second external electrodes,
the ground layer extends to the upper face and the lower face of the multilayer chip,
the part of the plated layer contacts the upper face and the lower face of the multilayer chip,
the first dummy layer and the second dummy layer are in each of the cover layers, and L1 is 10 µm or more and L2 is 15 µm or more, when a distance between the upper face or the lower face of the multilayer chip and each of the first and second dummy layers is L1 and a distance between each of the first and second dummy layers and an outermost one of the plurality of internal electrode layers in a stacking direction is L2.

2. The multilayer ceramic capacitor as claimed in claim 1, wherein the ground layer extends to the at least one face which is a bottom and/or top face(s) extending parallel to the internal electrode layers and which further includes two side faces of the multilayer chip other than the two end faces,
wherein the part of the plated layer contacts the two side faces,
wherein each of the first dummy layer and the second dummy layer is provided not only between the capacity region and the bottom and/or top face(s) but also in a side margin that covers edges of the plurality of internal electrode layers extending in an extension direction toward the two side faces of the multilayer chip other than the two end faces.

3. The multilayer ceramic capacitor as claimed in claim 2, wherein W1 is 10 µm or more and W2 is 15 µm or more, when a distance between the side faces of the multilayer chip and each of external edges of the first and second dummy layers is W1 and a distance between the edges of the plurality of internal electrode layers and each of the edges of the first and second dummy layers on the side of plurality of the internal electrode layers is W2.

4. The multilayer ceramic capacitor as claimed in claim 2, wherein the first dummy layer and the second dummy layer in the side margin continuously extend in a stacking direction of the multilayer chip.

5. The multilayer ceramic capacitor as claimed in claim 1, wherein a main component of the ground layer is Cu.

6. A multilayer ceramic capacitor comprising:
a multilayer chip having a parallelepiped shape in which each of a plurality of dielectric layers and each of a plurality of internal electrode layers are alternately stacked and each of the plurality of internal electrode layers is alternately exposed to two end faces of the multilayer chip, a main component of the plurality of dielectric layers being a ceramic;
a pair of external electrodes including a ground layer and a plated layer, the ground layer extending from the two end faces to at least two side faces of the multilayer chip other than the two end faces, the plated layer being provided on the ground layer, a part of the plated layer contacting the two side faces; and
a dummy layer that is provided between a capacity region and each of the two side faces and intersects with a region in which the plated layer contacts the multilayer chip without the ground layer, a main component of the dummy layer being a metal or an alloy including at least Ni, the capacity region being a region in which a set of the internal electrode layers connected to one of the end faces face another set of the internal electrode layers connected to the other,
wherein the dummy layer is not electrically connected to either one of the pair of external electrodes, and
wherein the dummy layer is interposed between (i) each edge of each of all the internal electrode layers, facing each corresponding face of the two side faces and (ii) the corresponding face of the two side faces, in a direction in which the two side faces are opposite to each other.

7. A multilayer ceramic capacitor comprising:

a multilayer chip having a parallelepiped shape in which each of a plurality of dielectric layers and each of a plurality of internal electrode layers are alternately stacked and each of the plurality of internal electrode layers is alternately exposed to two end faces of the multilayer chip, a main component of the plurality of dielectric layers being a ceramic;

first and second external electrodes each including a ground layer and a plated layer, the ground layer extending from each corresponding face of the two end faces to at least one face of four faces of the multilayer chip other than the two end faces, the plated layer being provided on the ground layer, a part of the plated layer contacting the at least one face;

a first dummy layer that is provided between a capacity region and the at least one face and intersects with, as viewed toward each corresponding face of the at least one face, a first region in which the part of the plated layer of the first external electrode contacts the at least one of the multilayer chip without the ground layer, a main component of the first dummy layer being a metal or an alloy including at least Ni, the capacity region being a region in which a set of the internal electrode layers connected to one of the two end faces face another set of the internal electrode layers connected to the other of the two end faces; and a second dummy layer that is provided between the capacity region and the at least one face and intersects with, as viewed toward each corresponding face of the at least one face, a second region in which the part of the plated layer of the second external electrode contacts the at least one face of the multilayer chip without the ground layer, a main component of the second dummy layer being a metal or an alloy including at least Ni, wherein:

the first dummy layer and the second dummy layer, which are provided between the capacity region and a same corresponding face of the at least one face, are separated and spaced from each other at a distance greater than a length of each of the first dummy layer and the second dummy layer in a length direction in which the two end faces are opposite to each other, the first dummy layer and the second dummy layer are not electrically connected to either one of the first and second external electrodes, the ground layer extends to two side faces of the multilayer chip other than the two end faces, the part of the plated layer contacts the two side faces, and the first dummy layer and the second dummy layer are provided in a side margin that covers edges of the plurality of internal electrode layers extending toward the two side faces of the multilayer chip other than the two end faces.

8. The multilayer ceramic capacitor as claimed in claim 7, wherein W1 is 10 μm or more and W2 is 15 μm or more, when a distance between the side faces of the multilayer chip and each of external edges of the first and second dummy layers is W1 and a distance between the edges of the plurality of internal electrode layers and each of the edges of the first and second dummy layers on the side of plurality of the internal electrode layers is W2.

9. The multilayer ceramic capacitor as claimed in claim 7, wherein the first dummy layer and the second dummy layer continuously extend in a stacking direction of the multilayer chip.

10. The multilayer ceramic capacitor as claimed in claim 7, further comprising:

cover layers that are provided between an upper face of the multilayer chip and the capacity region and between a lower face of the multilayer chip and the capacity region, a main component of the cover layers being the same as that of the plurality of dielectric layers, wherein:

the ground layer extends to the upper face and the lower face of the multilayer chip, the part of the plated layer contacts the upper face and the lower face of the multilayer chip, and the first dummy layer and the second dummy layer are in each of the cover layers.

* * * * *